United States Patent
Balemboy et al.

(10) Patent No.: US 9,073,646 B2
(45) Date of Patent: Jul. 7, 2015

(54) SYSTEM COMPRISING A SPATIAL MOTHER PROBE FORMING A SPATIAL CARRIER VEHICLE AND A PLURALITY OF SPATIAL DAUGHTER PROBES

(75) Inventors: Christophe Balemboy, Merignac (FR); Robert Andre Laine, Paris (FR); Xavier Sembely, Toulouse (FR)

(73) Assignee: ASTRIUM SAS, Paris (FR)

( * ) Notice: Subject to any disclaimer, the term of this patent is extended or adjusted under 35 U.S.C. 154(b) by 808 days.

(21) Appl. No.: 13/320,307

(22) PCT Filed: May 7, 2010

(86) PCT No.: PCT/EP2010/056251
§ 371 (c)(1),
(2), (4) Date: May 3, 2012

(87) PCT Pub. No.: WO2010/130651
PCT Pub. Date: Nov. 18, 2010

(65) Prior Publication Data
US 2012/0210808 A1    Aug. 23, 2012

(30) Foreign Application Priority Data
May 12, 2009    (FR) ...................... 09 53131

(51) Int. Cl.
*B64G 1/00* (2006.01)
*B64G 1/10* (2006.01)
*B64G 1/64* (2006.01)

(52) U.S. Cl.
CPC ................ *B64G 1/105* (2013.01); *B64G 1/641* (2013.01); *B64G 2001/643* (2013.01)

(58) Field of Classification Search
USPC .................. 244/158.1, 158.9, 172.6
See application file for complete search history.

(56) References Cited

U.S. PATENT DOCUMENTS

| | | | | |
|---|---|---|---|---|
| 4,854,526 A | * | 8/1989 | Rochefort | 244/158.1 |
| 5,052,640 A | * | 10/1991 | Chang | 244/172.7 |
| 5,152,482 A | | 10/1992 | Perkins et al. | |
| 5,178,347 A | | 1/1993 | Johnson et al. | |
| 5,199,672 A | | 4/1993 | King et al. | |
| 5,271,582 A | | 12/1993 | Perkins et al. | |
| 5,350,137 A | * | 9/1994 | Henley | 244/158.1 |
| 5,386,953 A | * | 2/1995 | Stuart | 244/158.4 |
| 5,605,308 A | | 2/1997 | Quan et al. | |
| 5,765,784 A | | 6/1998 | Lapins | |
| 6,036,144 A | * | 3/2000 | Sisk | 244/171.1 |
| 6,494,406 B1 | | 12/2002 | Fukushima et al. | |
| 7,513,459 B2 | * | 4/2009 | Cepollina et al. | 244/158.6 |

(Continued)

FOREIGN PATENT DOCUMENTS

| | | |
|---|---|---|
| EP | 0 409 711 | 1/1991 |
| EP | 1 013 546 | 6/2000 |

OTHER PUBLICATIONS

International Search Report dated Sep. 6, 2010, corresponding to PCT/EP2010/056251.

*Primary Examiner* — Christopher P Ellis
(74) *Attorney, Agent, or Firm* — Young & Thompson (57) ABSTRACT

A system includes a mother probe forming a carrier space vehicle (1) and a plurality of daughter probes (2a, 2b, 2c) aligned in a longitudinal axis (A) of the mother probe, in which the attachment of the daughter probes to the mother probe is carried out by a plurality of probe-supporting annular segments (5a, 5b, 5c) each provided with an annular collar (3a, 3b, 3c) for attaching a daughter probe.

24 Claims, 5 Drawing Sheets

(56) References Cited

U.S. PATENT DOCUMENTS

| | | | |
|---|---|---|---|
| 7,748,663 B1* | 7/2010 | Craig et al. | 244/158.1 |
| 7,780,119 B2* | 8/2010 | Johnson et al. | 244/173.1 |
| 8,016,240 B2* | 9/2011 | Caplin et al. | 244/158.5 |
| 8,511,617 B2* | 8/2013 | Caplin et al. | 244/173.1 |
| 2002/0000596 A1* | 1/2002 | Carstensen | 257/296 |
| 2006/0145016 A1* | 7/2006 | Renfro | 244/158.1 |

* cited by examiner

SYSTEM COMPRISING A SPATIAL MOTHER PROBE FORMING A SPATIAL CARRIER VEHICLE AND A PLURALITY OF SPATIAL DAUGHTER PROBES

BACKGROUND OF THE INVENTION

1. Field of the invention

The present invention concerns a system comprising a spatial mother probe forming a spatial carrier vehicle, and a plurality of spatial daughter probes and the assembly of said spatial daughter probes on the spatial mother probe forming the spatial carrier vehicle.

The technical field of the present invention is the spatial field, and notably spatial missions for taking away several probes that are to be released from a unique spatial carrier vehicle.

2. Description of the Related Art

The question of releasing several satellites from a single launcher is already known, and notably documents U.S. Pat. Nos. 5,152,482, 5,605,308, 5,199,672 and 5,271,582 concern assemblies whereby launchers are equipped with satellite clusters set around a longitudinal axis of the launcher.

Said assemblies, adapted to a rapid release of multiple satellites, are not adapted for the release of spatial probes due to the fact that major trajectory corrections of the carrier vehicle would be necessary in terms of direction and angular rotation around the longitudinal axis in order to release such probes.

Document U.S. Pat. No. 5,350,137, on its part, simplifies the assembly of satellites on a launcher, since it provides for satellites having a paraboloid-shaped structure supporting auxiliary equipment, the paraboloid-shaped structure of the satellites enabling to pile them up, one on top of the other, according to a longitudinal axis of the launcher beneath a separable cap.

Document U.S. Pat. No. 5,765,784 describes, on its part, a spatial carrier vehicle on which are hung clusters of daughter probes.

The daughter probes or landing modules are placed around the carrier vehicle and, by consequence, have distinct directions of relative separation, which induce a variation in the system's symmetry during the release operations.

In this case, it is necessary to modify the attitude of the spatial carrier vehicle prior to each separation in order to correctly orientate each descending module.

Additionally, this type of configuration not only requires a complex structure as regards the carrier vehicle, but the carrier vehicle/probe assembly is of significant diameter. Moreover, the symmetry variations of the system not only complicates the procedure as the release process goes on, but also increase the quantity of fuel required and the mass of the launcher.

BRIEF SUMMARY OF THE INVENTION

The present invention concerns a system notably enabling to separate several descending modules from a spatial vehicle or a mother probe after an interplanetary voyage by way of an adapted attitude, while minimising the manoeuvres to be accomplished for the spatial vehicle between two successive separations and by minimising the redesign work for two successive missions, or in the case of a change in configuration.

In such context, the spatial vehicle formed by the mother probe is itself a probe adapted to an interplanetary voyage, to communicating data with the Earth throughout its spatial journey and possibly to regulating the temperature and the storage parameters of the daughter probes during the spatial voyage.

More precisely, the present invention provides for a system comprising a mother probe forming a spatial carrier vehicle and a plurality of daughter probes aligned according to a longitudinal axis of the mother probe, whereby the attachment of the daughter probes on the mother probe is embodied by means of a plurality of probe-supporting annular segments, each equipped with an annular collar for attaching a daughter probe.

The mother probe is a spatial probe adapted to travelling from one planet to another and to conveying the daughter probes.

According to a preferred embodiment, at least some of the probe-supporting annular segments comprise an external cylindrical hood element for the protection of the daughter probes, said configuration moreover facilitating the design of the thermal control systems of the daughter probes.

Preferably, at least one said cylindrical hood element is orientated in relation to the annular collar of the segment holding it in order to protect a front daughter probe, the collar being orientated in order to ensure the attachment of a rear daughter probe.

More particularly, at least one intermediary probe-supporting annular segment comprises, on the rear probe side, an extension of the cylindrical hood element for attaching a rear annular segment.

The system according to the invention may further be such that a first annular segment is fixed to the spatial carrier vehicle and comprises an annular edge for attaching a cylindrical hood element of a second probe-supporting annular segment.

According to an embodiment of the invention, a last annular segment leaves apparent the daughter probe that it supports.

The annular collars are advantageously of a generally tapered shape, the daughter probe attachments being fitted onto the inner annular edge of the collars.

In such a case, the daughter probes preferably comprise a conical rear cap imbricating into the collar.

Advantageously, the daughter probes are placed on the front of the carrier vehicle.

According to the invention, the successive release of the daughter probes is done by ejecting such probes frontwards by means of a thrust mechanism at the level of the interface in between the annular collars and the daughter probes.

The release of at least one daughter probe is followed by the release of its supporting annular segment.

According to a particular aspect of the invention, at least some of the annular segments are equipped with thermal control radiators for the daughter probes.

BRIEF DESCRIPTION OF THE DRAWINGS

Other characteristics and advantages of the invention will be better understood upon reading the description, followed by a non-exhaustive embodiment example of the invention referring to the drawings that represent.

DETAILED DESCRIPTION OF THE PREFERRED EMBODIMENTS

The present invention is applied, for example, not only to spatial missions whereby a spatial transport module, such as a spatial probe, takes away several landing modules towards a planet to be studied, but also to spatial missions taking away several daughter probes intended to orbit around a celestial body.

Such a probe is not comparable with a simple launcher whose function is to place in orbit one or several satellites and whose operating time is limited to several minutes, or at the most, to just a few hours after launching.

Figure 1:
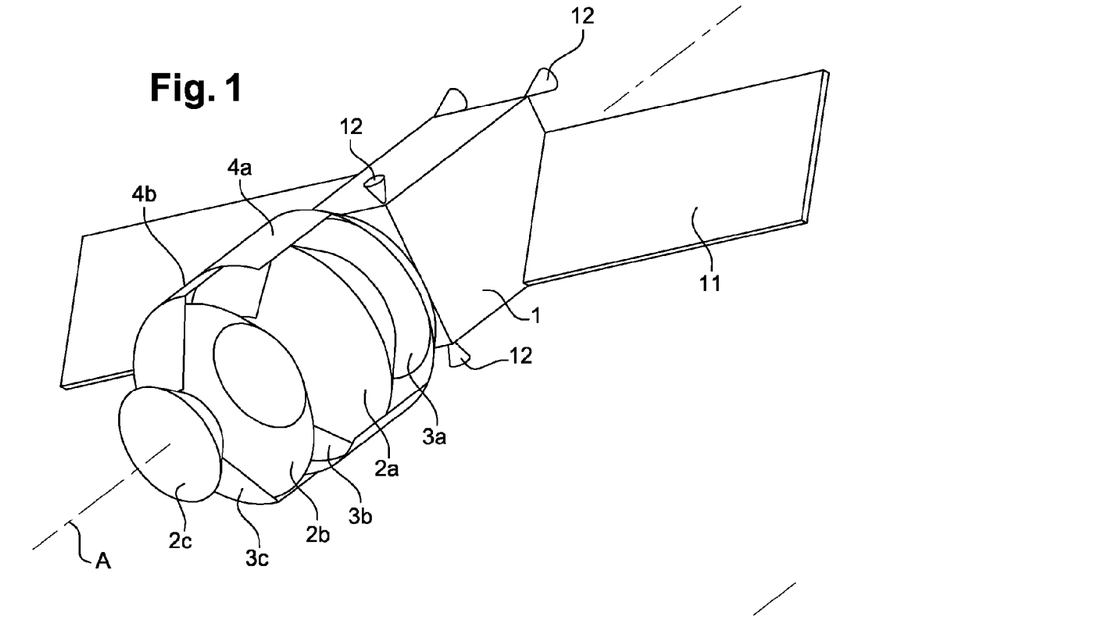
FIG. 1: a schematic view showing a section in perspective representing a system according to the invention.
Figure 2:
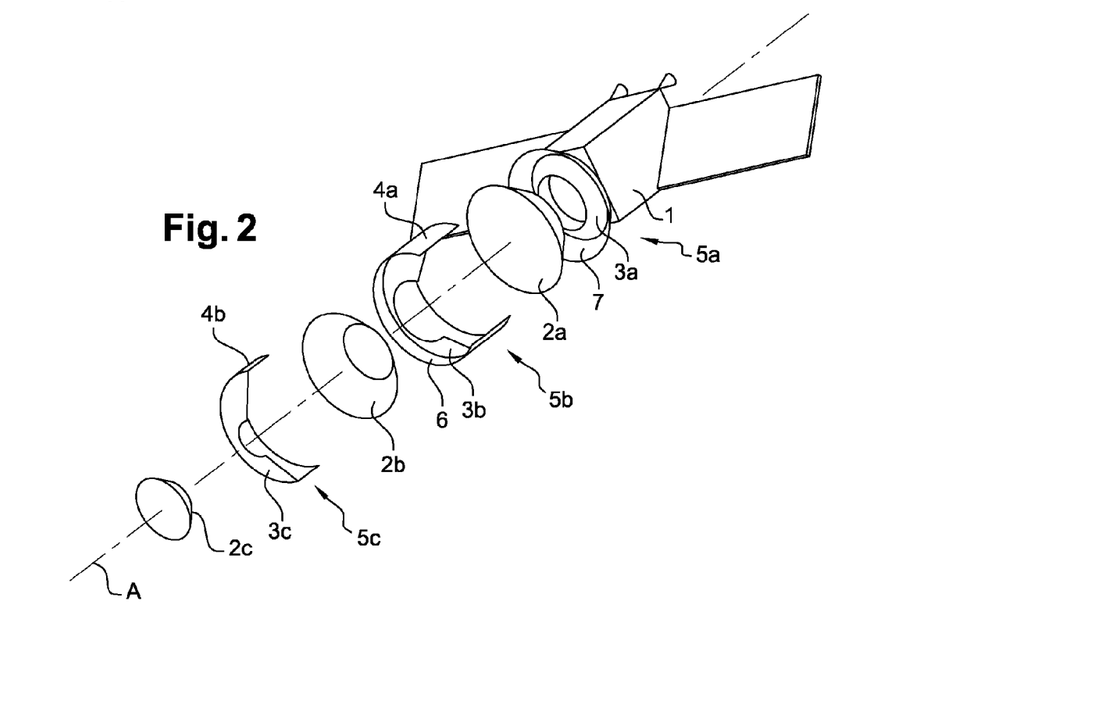
FIG. 2: a fragment view of the system in FIG. 1.

FIGS. 1 and 2 illustrate the overall invention system.

The system comprises a spatial carrier vehicle 1 constituted by a spatial mother probe equipped with solar panels 11, with electronic guiding and communication systems, and with adapted regulation systems for maintaining the probe in working order throughout the months or years of the spatial journey.

For its guidance, the mother probe is additionally equipped with attitude and propulsion adjustment nozzles 12.

On the mother probe are placed a plurality of daughter probes 2a, 2b, 2c which are, according to the invention, aligned according to a longitudinal axis A of the mother probe constituting a carrier vehicle.

In view of making assembly simple and compact, the attachment of the daughter probes on the carrier vehicle formed by the mother probe is embodied by means of a plurality of probe-supporting annular segments 5a, 5b, 5c, each equipped with an annular collar 3a, 3b, 3c for attaching a probe.

The system of the invention is thus designed so that the centre of gravity of the assembly is close to the alignment axis of the different probes, thereby reducing the hindrance of the assembly attitude during successive probe release processes.

Furthermore, even in the case of probes of differing mass, the assembly remains easy to balance.

An approximate idea of speed that should be thrust into a probe corresponds to around 11.5 km/s, which is far greater than the speed given to a satellite. For a satellite and a low orbit, for example at 400 km from Earth, the speed is around 7.5 km/s.

Since the energy varies according to the squared speed, a probe is far more sensitive in terms of mass in comparison to a satellite.

FIG. 2 represents a fragmented version of the system according to the axis A where the daughter probes can be seen piled up in alignment, departing from a front daughter probe on the carrier vehicle 1 side in the direction of the rear daughter probes away from the carrier vehicle. For comprehension purposes, the front of the carrier vehicle shall refer to the part found at the front of the trajectory during release of the daughter probes.

The principle of the invention is thus to pile up the elementary modules comprising the daughter probes and the annular segments along an axis of the carrier vehicle constituted by the mother probe.

The daughter probes may notably be descending modules intended to be placed on a planet to be observed, whereas the mother probe shall remain in orbit circulating around said planet.

The daughter probes are placed on the front of the carrier vehicle 1 and are successively released one after the other in an almost fixed direction, with an intermediary separation from the carrying structure of a rear probe prior to the separation of the front probe or module.

The front of the vehicle is defined in relation to the orientation of the vehicle when in the release phase of the daughter probes.

FIGS. 3A to 5C illustrate a sequence of successive separations of all the daughter probes from the mother probe constituting the carrier module.

The invention enables to envisage a sequence of successive separations with minimal change in attitude of the carrier vehicle, thereby reducing the needs in propellants for driving the sequence of separations.

In particular, the orientations targeted during the phases corresponding to the release of the probes remain closely related and require only slight trajectory modifications of the spatial carrier vehicle.

Figure 3A:
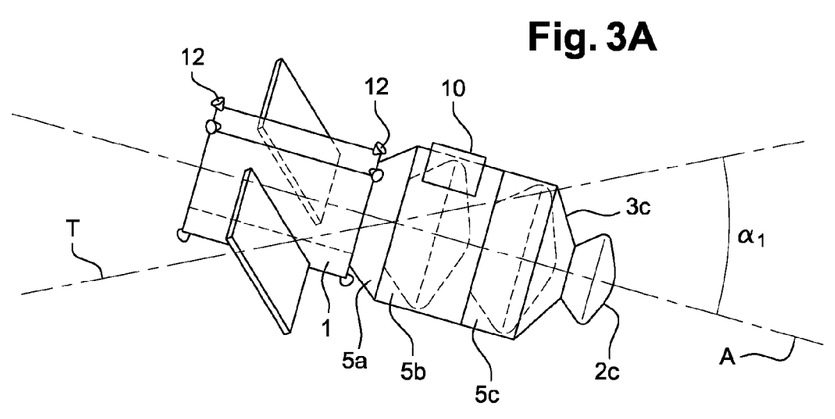
FIG. 3A: a view in perspective representing the system in FIG. 1 prior to the first release.

FIG. 3A corresponds to the position of the system in relation to a trajectory T enabling the release of the first probe.

With the nozzles 12, the system is orientated around its centre of gravity in relation to the trajectory T so that, during the release thrust of the probe, the latter is placed on the desired trajectory with the desired attitude, for example a trajectory for entering the atmosphere of the celestial body on which the probe must be placed.

In the release configuration of the probe 2c, the angle created by the symmetry axis A of the probe with the trajectory is marked by the value $\alpha 1$.

Figure 3B:
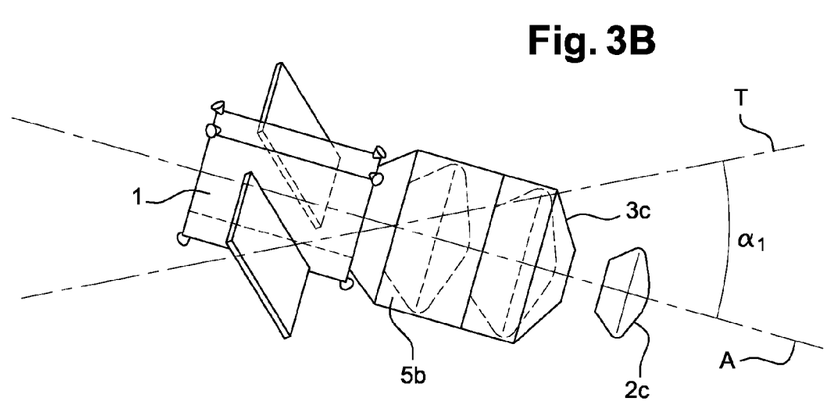
FIG. 3B: a view of the system in FIG. 1 during the first release.

FIG. 3B represents the system during release of the probe 2c.

Upon release of said probe, the system continues on its way and prepares itself for the release of the second probe.

Figure 4A:
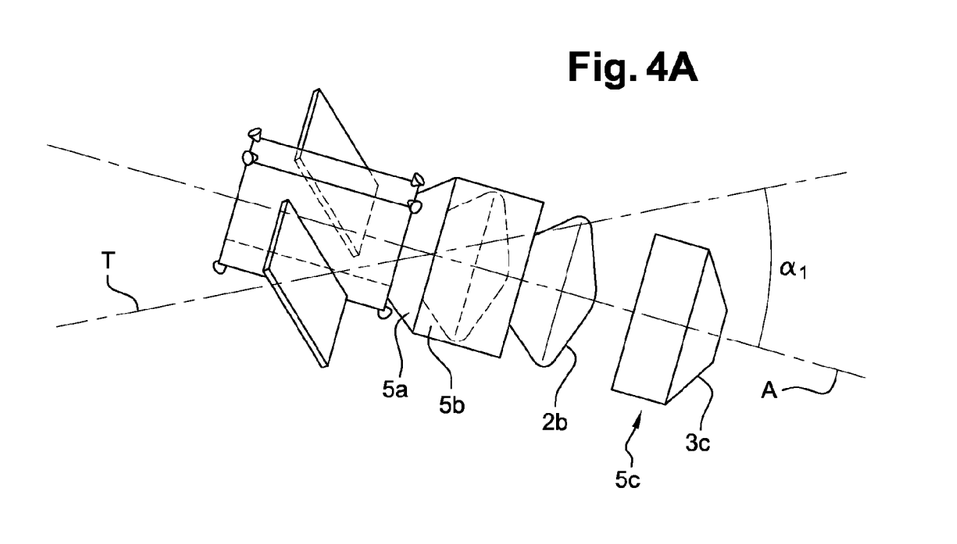
FIG. 4A: a view of the system in FIG. 1 during the first intermediary structure release.

In order to do so, in FIG. 4A, segment 5c, comprising the collar 3c for attaching the first probe, is released in order to reveal the second probe 2b.

Figure 4B:
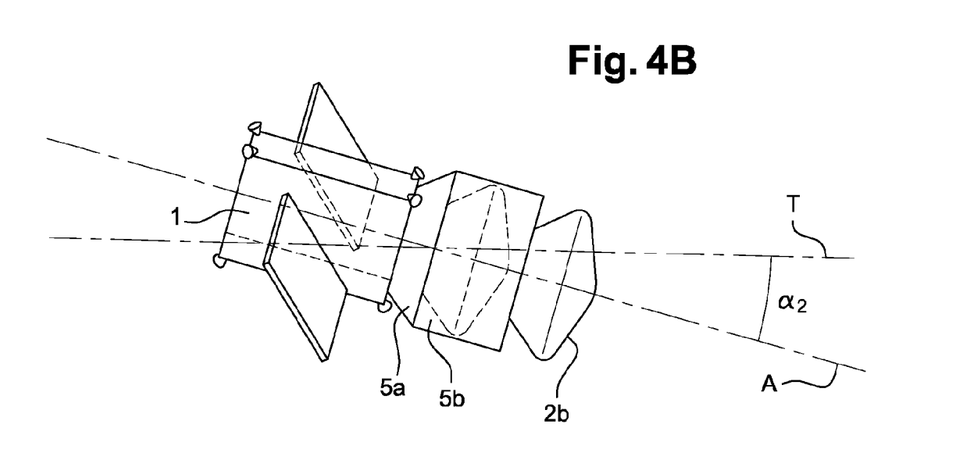
FIG. 4B: a view of the system in FIG. 1 positioned ready for the second release.
Figure 4C:
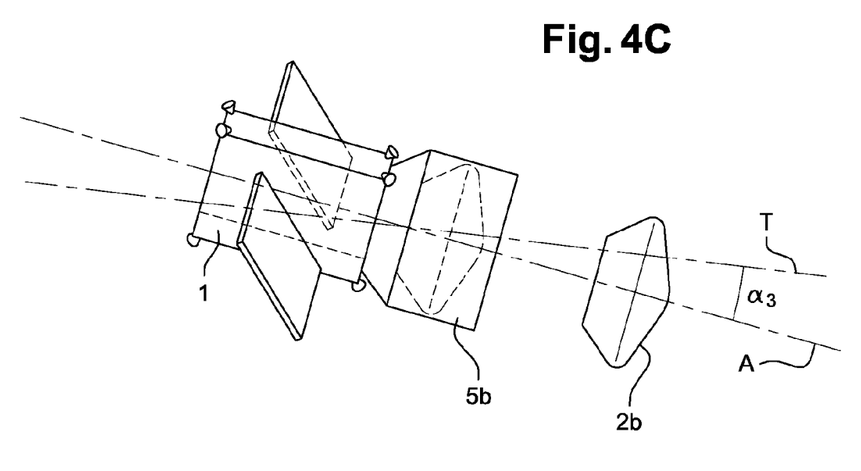
FIG. 4C: a view of the system in FIG. 1 during the second release.

In FIG. 4B, the vehicle performs the necessary attitude correction in order to be able to release the second probe according to the chosen trajectory, the angle made between the axis A of the probe and the trajectory T is marked $\alpha 2$, while in FIG. 4C, release of the second probe is initiated.

Figure 5A:
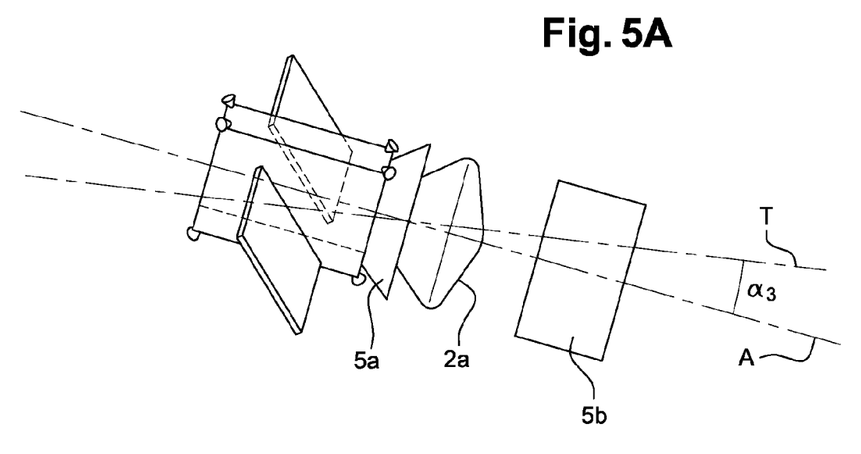
FIG. 5A: a view of the system in FIG. 1 during the second intermediary structure release.

According to FIG. 5A, the segment 5b comprising the collar for attaching the second probe is released in order to reveal the third probe 2a.

Figure 5B:
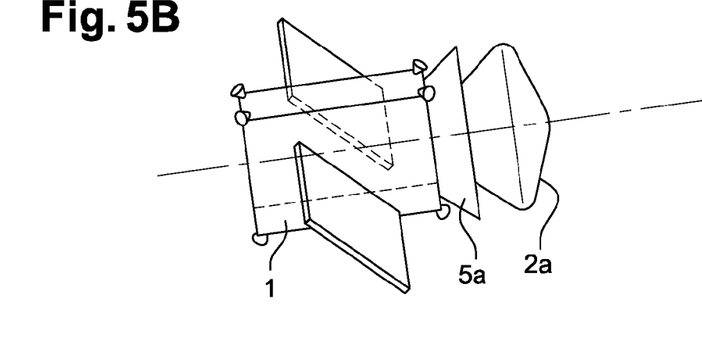
FIG. 5B: a view of the system in FIG. 1 positioned ready for the third release.
Figure 5C:
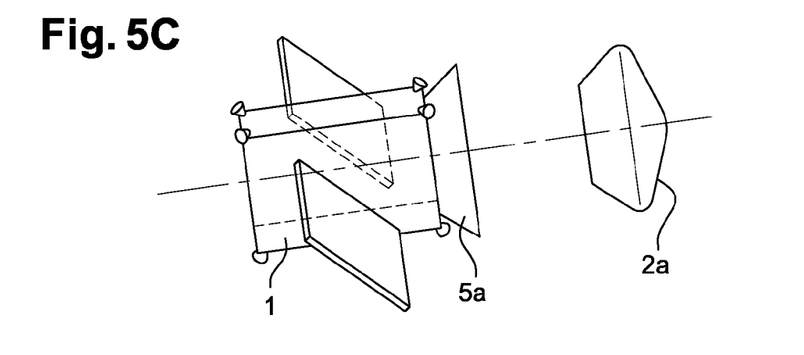
FIG. 5C: a view of the system in FIG. 1 during the third release.

This last probe is released such as represented in FIG. 5C, subsequent to a possible new alignment of the module in relation to its trajectory as represented in FIG. 5B.

Due to the principle of the invention, very few manoeuvres are necessary for releasing the daughter probes on the forecasted trajectories, pointing the module via pitching in relation to its own trajectory being practically the only operation to be performed in order to deposit several probes on a celestial body.

Furthermore, the symmetrical revolution configuration of the system of the invention, whereby all the probes are on a single axis, simplifies management of the overall attitude in accordance with the thermal control constraints during the celestial Earth/Body cruise.

As illustrated in the figures, and notably in FIG. 2, at least some of the probe-supporting annular segments comprise an external cylindrical hood element 4a, 4b for the protection of the probes.

These elements of cylindrical hoods 4a, 4b are orientated in relation to the annular collars 3b, 3c of the segment 5b, 5c, thereby holding them in order to protect a front probe 2a, 2b, the collars being orientated in order to ensure the attachment of a rear probe 2b, 2c.

The cylindrical hood elements block out the sun rays, reducing their intensity. This protects the probes that are inside the hoods and reduces their thermal control needs.

On the other hand, according to the example, a last annular segment 5c leaves apparent the probe that it holds, the latter where appropriate being possibly protected by a specific hood or by traditional multi-layer insulation.

Hence, with the exception, according to the example, of the farthest probe of the module, the probes are inside a structure and not directly open to space.

Accordingly, their radiative thermal environment is better controlled and their individual thermal control is thereby simplified.

Said thermal control may especially be entrusted to the mother probe throughout the voyage, the daughter probes remaining inactive until their release.

In order to achieve that, the mother probe equipped with solar panels may comprise adapted means for ensuring a thermal control of at least some of the daughter probes and additionally comprise means for constantly charging or recharging the batteries of the daughter probes.

For the probes protected by the hoods, if the thermal control requires the installation of radiators 10, these could be placed on the structures, for example on the external wall of the cylindrical hoods, such as illustrated on the hood 5b in FIG. 3A, and will thus not interfere with the probes' atmospheric-entry thermal protection.

Besides the hood, at least one intermediary probe-supporting annular segment comprises, in the region of the rear probe, an extension 6 of the cylindrical hood element for attaching a rear annular segment.

Said extension 6 enables to separate the junction zone of a rear hood from a front segment in relation to the collar, so that at the time of release of a segment, there is no risk of damaging the collar of the front segment.

Likewise, in order to constitute the junction between the module 1 and the first hood 4a of the second annular segment, a first annular segment is fixed to the spatial carrier vehicle and comprises an annular edge 7 for attaching said cylindrical hood element 4a.

The annular collars 3a, 3b, 3c are of a generally tapered shape, the daughter probe attachments being fitted on the inner annular edge of the collars, the probes comprising, according to the example, a conical rear cap 8 imbricating into the collar.

Figure 6:
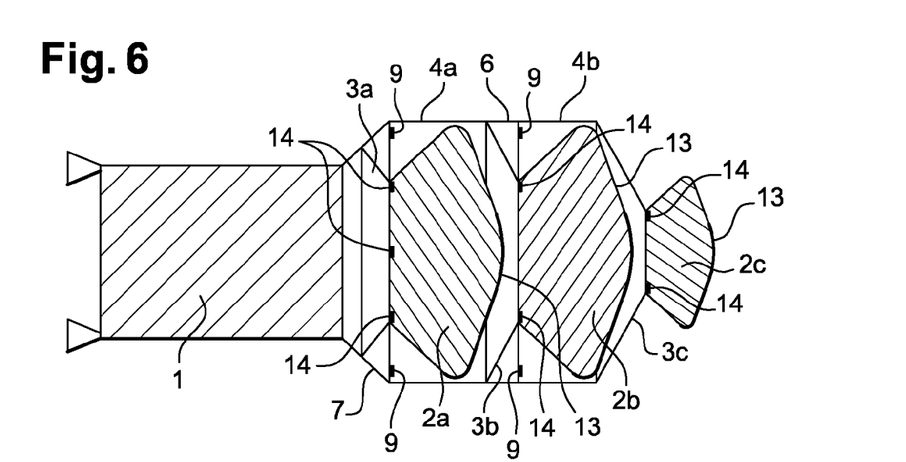
FIG. 6: a longitudinal section sketch of the system in FIG. 1.

The sectional view in FIG. 6 amply illustrates the compactness of the system for which the collars 3b and 3c, notably, are adapted according to the shape of the probe shields 13.

This view also illustrates the thrust mechanisms 14 at the interface level in between the annular collars and the probes for ejecting the probes, as well as the thrust mechanisms 9 for releasing the segments holding the hoods.

The system of the invention is adapted to a long-term voyage, whereby the daughter probes are carried by the mother probe.

The invention claimed is:

1. A system comprising:
a mother probe forming a spatial carrier vehicle;
a plurality of daughter probes aligned according to a longitudinal axis of the mother probe; and
a plurality of probe-supporting annular segments that attach the daughter probes on the mother probe, wherein each probe-supporting annular segment is equipped with an annular collar supporting a respective one of the daughter probes, wherein,
at least some of the probe-supporting annular segments comprise an external cylindrical hood element for the protection of the daughter probes,
the daughter probes include i) a front daughter probe supported by the annular collar of a first of the probe-supporting annular segments, and ii) a first rear daughter probe supported by the annular collar of a second of the probe-supporting annular segments, the front daughter probe being closer to the mother probe than the rear daughter probe, and
said external cylindrical hood element of the second probe-supporting annular segment is orientated in relation to the annular collar of the first probe-supporting annular segment in order to protect the front daughter probe supported by the first probe-supporting annular segment.

2. The system according to claim 1, wherein said second probe-supporting annular segment comprises, on the first rear probe side, an extension of the cylindrical hood element for attaching a third one of the probe-supporting annular segments.

3. The system according to claim 1, wherein at least a first probe-supporting annular segment is fixed to the spatial carrier vehicle and comprises an annular edge attaching to the external cylindrical hood element of second probe-supporting annular segment.

4. The system according to claim 1, wherein a last one of the probe-supporting annular segments supports a final rear probe and leaves apparent the final rear probe.

5. The system according to claim 1, wherein the annular collars are generally of tapered shape, with the daughter probes being fitted on an inner annular edge of the annular collars.

6. The system according to claim 5, wherein the daughter probes comprise a conical rear cap imbricating into the collar.

7. The system according to claim 1, wherein the daughter probes are placed on the front of the carrier vehicle.

8. The system according to claim 1, wherein said system comprises a thrust mechanism at the level of the interface in between the annular collars and the daughter probes and wherein a successive release of the daughter probes is done by ejecting such probes frontwards by means of said thrust mechanism.

9. The system according to claim 1, wherein the release of at least one daughter probe is followed by the release of its supporting annular segment.

10. The system according to claim 1, wherein at least some annular segments are fitted with thermal control radiators for the daughter probes.

11. The system according to claim 1, wherein the mother probe comprises adapted means for ensuring a thermal control of at least some of the daughter probes.

12. A system, comprising:
a mother probe forming a spatial carrier vehicle;
a plurality of daughter probes aligned according to a longitudinal axis of the mother probe; and a plurality of probe-supporting annular segments that attach the daughter probes on the mother probe, wherein each probe-supporting annular segment is equipped with an annular collar supporting a respective one of the daughter probes, wherein at least one of the annular segments is designed to be released after release of a first daughter probe to thereby reveal a second daughter probe.

13. The system according to claim 12, wherein at least some of the probe-supporting annular segments comprise an external cylindrical hood element for the protection of the daughter probes.

14. The system according to claim 13, wherein, the daughter probes include i) a front daughter probe supported by the annular collar of a first of the probe-supporting annular segments, and ii) a first rear daughter probe supported by the annular collar of a second of the probe-supporting annular segments, the front daughter probe being closer to the mother probe than the rear daughter probe, and said external cylindrical hood element of the second probe-supporting annular segment is orientated in relation to the annular collar of the first probe-supporting annular segment in order to protect the front daughter probe supported by the first probe-supporting annular segment.

15. The system according to claim 14, wherein said second probe-supporting annular segment comprises, on the first rear probe side, an extension of the cylindrical hood element for attaching a third one of the probe-supporting annular segments.

16. The system according to claim 13, wherein at least a first probe-supporting annular segment is fixed to the spatial carrier vehicle and comprises an annular edge attaching to the external cylindrical hood element of the second probe-supporting annular segment.

17. The system according to claim 13, wherein a last one of the probe-supporting annular segments supports a final rear probe and leaves apparent the final rear probe.

18. The system according to claim 12, wherein the annular collars are generally of tapered shape, with the daughter probes being fitted on an inner annular edge of the annular collars.

19. The system according to claim 18, wherein the daughter probes comprise a conical rear cap imbricating into the collar.

20. The system according to claim 12, wherein the daughter probes are placed on a front of the carrier vehicle.

21. The system according to claim 12, wherein said system comprises a thrust mechanism at the level of the interface in between the annular collars and the daughter probes and wherein a successive release of the daughter probes is done by ejecting such probes frontwards by means of said thrust mechanism.

22. The system according to claim 12, wherein the release of at least one daughter probe is followed by the release of its supporting annular segment.

23. The system according to claim 12, wherein at least some annular segments are fitted with thermal control radiators for the daughter probes.

24. The system according to claim 12, wherein the mother probe comprises adapted means for ensuring a thermal control of at least some of the daughter probes.

* * * * *